US009551437B2

(12) United States Patent
Defrance

(10) Patent No.: US 9,551,437 B2
(45) Date of Patent: Jan. 24, 2017

(54) BUNDLE SPACER AND CLAMP ASSEMBLY FOR CONDUCTORS

(71) Applicant: HUBBELL INCORPORATED, Shelton, CT (US)

(72) Inventor: Robert V. Defrance, Poughkeepsie, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/679,602

(22) Filed: Apr. 6, 2015

(65) Prior Publication Data
US 2016/0290532 A1    Oct. 6, 2016

(51) Int. Cl.
F16L 3/08    (2006.01)
F16L 3/10    (2006.01)
H02G 7/12    (2006.01)

(52) U.S. Cl.
CPC ............ F16L 3/1075 (2013.01); H02G 7/125 (2013.01)

(58) Field of Classification Search
CPC ........ F16L 3/1075; F16L 3/1083; F16L 3/105; F16L 21/06; H02G 7/125; H02G 7/12; H02G 7/053; H02G 7/14; F16B 7/04; F16B 2/10; Y10T 24/3962; Y10T 24/44504; Y10T 24/3958
USPC ..... 174/62; 248/62–63, 67.5; 24/280, 135 K
See application file for complete search history.

(56) References Cited

U.S. PATENT DOCUMENTS

| 1,853,010 | A | * | 4/1932 | Wray | .................... | F16L 3/1075 |
| | | | | | | 248/62 |
| 2,849,777 | A | | 9/1958 | Ridgers et al. | | |
| 3,167,286 | A | * | 1/1965 | Sherburne | ................. | F16L 3/11 |
| | | | | | | 24/279 |
| 3,613,104 | A | | 10/1971 | Bradshaw | | |
| 3,979,553 | A | | 9/1976 | Smart | | |
| 4,391,458 | A | * | 7/1983 | Blakeley | ................. | F16L 41/12 |
| | | | | | | 285/112 |
| 5,018,768 | A | * | 5/1991 | Palatchy | ................. | F16L 17/04 |
| | | | | | | 24/284 |
| 5,371,320 | A | | 12/1994 | Torok et al. | | |
| 6,030,006 | A | * | 2/2000 | Lin | ......................... | F16L 23/10 |
| | | | | | | 24/279 |
| 8,079,122 | B2 | | 12/2011 | Kwon et al. | | |
| 2013/0067744 | A1 | | 3/2013 | DeFrance et al. | | |

(Continued)

OTHER PUBLICATIONS

International Search Report dated Apr. 21, 2016 that issued in a corresponding PCT Patent Application No. PCT/US16/23873.

*Primary Examiner* — Christopher E Garft
(74) *Attorney, Agent, or Firm* — Dickinson Wright PLLC

(57) ABSTRACT

A spacer clamp assembly includes a clamping body with a recess for receiving a cable and a bolt hole defining a passage. A resilient member on the clamping body has a bolt hole receiving a clamping bolt. The bolt is resiliently biased in the bolt hole of the resilient member to a clamping position. A keeper has a first end coupled to the first end of the clamping body and a second end with an open slot configured for mating with the clamping bolt in the clamping position. The keeper has a contact surface to contact the clamping bolt during closing of the keeper for guiding the bolt along the contact surface into the slot. The resilient member enables the clamping bolt to move when contacting the contact surface and bias the bolt into the slot to the clamping position in the closed clamping position.

19 Claims, 6 Drawing Sheets

(56) References Cited

U.S. PATENT DOCUMENTS

2015/0229113 A1* 8/2015 Dobrinski .............. H02G 7/125
174/42

* cited by examiner

BUNDLE SPACER AND CLAMP ASSEMBLY FOR CONDUCTORS

FIELD OF THE INVENTION

The present invention relates generally to a spacer and clamp assembly for a conductor bundle that maintains a minimum distance between the conductors. More particularly, the present invention relates to a clamp assembly that prevents movement of the electrical cables with respect to one another after installation. The present invention also relates to a spacer and clamp assembly where a keeper of a clamp assembly closes with respect to the clamping body without requiring manually moving or adjusting the clamping bolt.

BACKGROUND OF THE INVENTION

In the electrical utilities industry, conductor bundles can be used to transmit bulk power with reduced loss, thereby increasing transmission efficiency. A conductor bundle is a series of two or more conductors spaced apart by non-conducting spacers. Bundled conductors are used on high-voltage power lines to help reduce energy losses due to the corona effect, and reduce audible noise and radio interference. As a result, the conductor bundles improve the power transmission process.

However, one disadvantage associated with conductor bundles is that they have higher wind loading. The spacers must maintain separation between the conductors of the bundle to prevent arcing, particularly during higher winds. Arcing can cause damage to equipment of the power distribution system.

Spacer assemblies for conductor bundles exist in which two clamping bodies move toward one another and are then secured together to space the conductors apart. A fastener is used to secure the two clamping bodies together. A disadvantage associated with such spacer assemblies is that the fastener must be removed from at least one of the clamping bodies to allow the clamping bodies to move with respect to one another when opening or closing the spacer assembly. An operator in the field cannot secure the clamping bodies together if the fastener is dropped or lost. One type of clamping assembly has the clamping bodies hinged together and secured by a bolt. Typically, the bolt must be positioned manually by the operator in the clamping position. To overcome this disadvantage, a spacer assembly for conductor members can have a fastener that is not removable from either clamping body to open or close the spacer assembly.

Examples of cable bundle spacing devices are shown in U.S. Pat. Nos. 3,613,104, 3,979,553, 8,079,122 and U.S. Patent Publication No. 2013/0067744. While these prior devices have generally been suitable for the intended purpose, these devices have some limitations.

Accordingly, a need exists to provide a spacer assembly for an improved conductor bundle and cable spacer damper that is easy to install and maintains spacing between conductors of a conductor bundle.

SUMMARY OF THE INVENTION

The present invention is directed to a bundle spacer and clamp assembly providing a convenient and simple mechanism for attaching the spacer to the cable bundle. One feature of the present invention is to provide a spacer assembly for a conductor bundle that maintains a predetermined spacing between conductors.

Another feature of the present invention is to provide a spacer and clamp assembly that is quick and easy to install. The clamp assembly has a clamping body and a keeper. A clamping bolt is attached to the clamping body in a manner to align with and be positioned in the keeper for clamping the cable between the keeper and the clamping body.

Another feature of the present invention is to provide a spacer having a clamp assembly that is able to clamp onto the cable and enable the clamp assembly to close easily around the cable without having to align the connecting bolt manually.

A further feature of the present invention is to provide a clamp assembly in which a fastener is retained in a position so that the clamp assembly can close without manually realigning or manually moving the clamping bolt with respect to the clamp assembly.

The foregoing objects are basically attained by a clamp assembly having a clamping body with a first end, a second end having a mounting member for mounting the clamp assembly to a support, and a first recess between the first end and second end configured for receiving a cable. A hole forming a passage extends through the clamping body. A fastener has a first end received in the passage and a second end spaced from the clamping body. The fastener is biased to a clamping position for clamping alignment with a keeper. The keeper has a first end coupled to the first end of the clamping body and a second recess configured for receiving the cable and for cooperating with the first recess. A slot with an open end is formed in a second end of the keeper. The slot is configured for receiving the fastener in the clamping position. The keeper has an inclined surface on a bottom face that extends to the open end of the slot for contacting the second end of the fastener when closing the keeper with respect to the clamping body and guiding the second end of the fastener to the open end of the slot and into the slot into a clamping position for clamping the cable between the clamping body and the keeper.

The foregoing objects are also basically attained by a clamp assembly including a clamping body having a recess configured for receiving a cable and having a passage extending through the clamping body. A bolt has a first end received in the passage of said clamping body and a second end spaced from the first end. A keeper with a first end is hinged to the clamping body. The keeper has a second end with a slot having an open end and is configured for receiving the clamping bolt. The second end of said keeper has a guide surface configured for contacting the clamping bolt when closing the keeper with respect to said clamping body and guiding the clamping bolt to the open end of slot and into the slot for clamping the cable between said clamping body and the keeper.

The foregoing objects are also basically attained by a clamp assembly having a clamping body with a first end, a second end and a recess between the first end and second end and configured for receiving a cable. The clamping body has a bolt hole defining a passage extending between a top face and a bottom face. A resilient member is provided on the clamping body where the resilient member has a bolt hole aligned with the bolt hole of the clamping member. A clamping bolt is received in the bolt hole of the resilient member and the bolt hole of the clamping body. The bolt is resiliently biased in the bolt hole of the resilient member to a clamping position. A keeper has a first end coupled to the first end of the clamping body. The keeper has a second end with an open slot configured for mating with the clamping bolt in the clamping position. The keeper has a contact surface oriented to contact the clamping bolt during closing of the keeper with respect to the clamping body and guiding the bolt along the contact surface into the slot. The resilient member enables the clamping bolt to move from the clamping position to a second position when contacting the contact surface and into the slot to said clamping position for clamping the cable between the keeper and the clamping body.

Various objects, advantages, and salient features of the invention will become apparent from the following detailed description, which, taken in conjunction with the annexed drawings, discloses an exemplary embodiment of the present invention.

As used in this application, the terms "front," "rear," "upper," "lower," "upwardly," "downwardly," and other orientation descriptors are intended to facilitate the description of the exemplary embodiments of the present invention, and are not intended to limit the structure thereof to any particular position or orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which.

Throughout the drawings, like reference numerals will be understood to refer to like parts, components and structures.

DETAILED DESCRIPTION OF THE INVENTION

Figure 1:
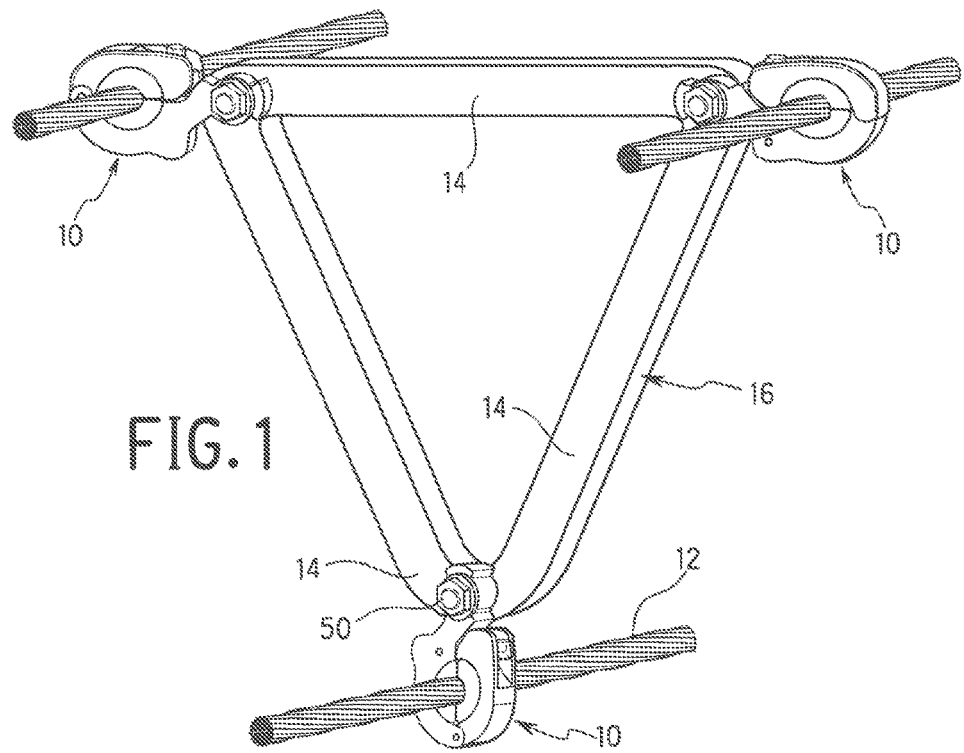
FIG. 1 is a perspective view of the bundle spacer and clamp assembly in accordance with an embodiment of the present invention for receiving a conductor.

The present invention is directed to a cable damper spacer assembly 16 having clamp assembly 10 adapted to receive conductor cables 12 and to maintain the conductors 12 in a fixed spacing as shown in FIG. 1. The cables 12 are typically not insulated so that maintaining a fixed spacing between high voltage conductors substantially prevents arcing and other dangerous and adverse electrical occurrences that can occur when the high voltage conductors move too close together, such as during high winds that can cause the conductors to move. The spacer clamp assembly in accordance with the invention maintains the conductors or cables at a fixed distance apart to substantially prevent arcing and contact between the conductors.

The cable spacer clamping assembly 10 of the invention is coupled to the arms 14 of a frame of the assembly 16 in a standard manner known in the art. The frame typically has several arms that extend outwardly from a central location for spacing the conductors a predetermined distance apart from each other. In one example, the frame can have four arms for supporting the conductors. One or more of the claim assemblies 10 can be coupled to each of the arms, although typically only one clamp assembly is coupled to the end of each arm to maintain the desired spacing between the conductors.

Figure 2:
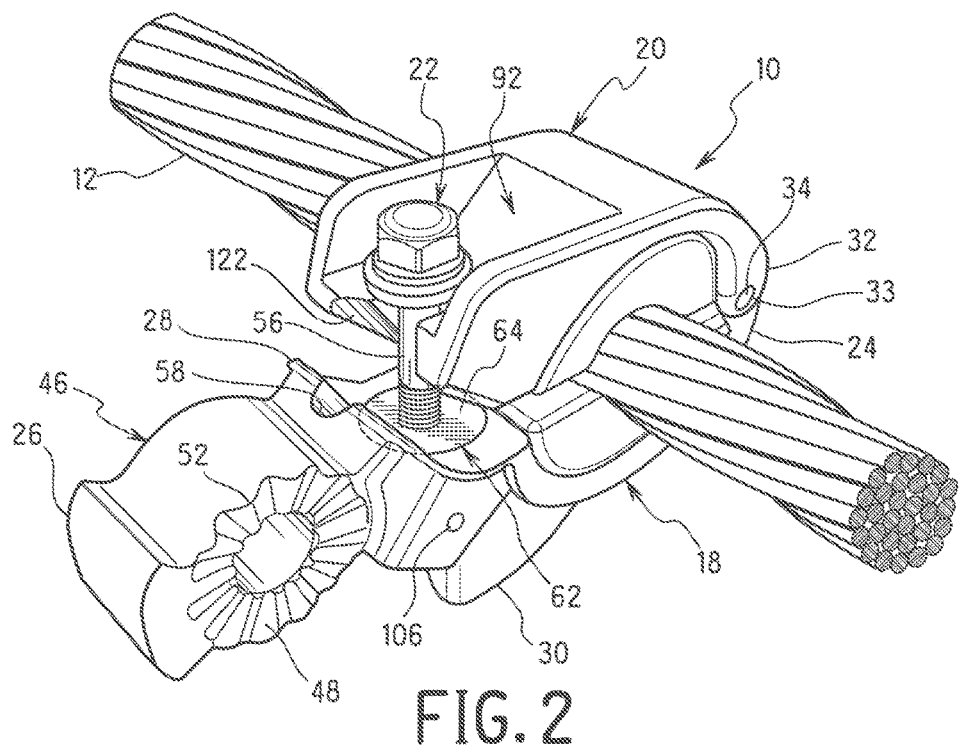
FIG. 2 is a perspective view of the clamp assembly of FIG. 1.

Referring to FIGS. 2-11, the clamping assembly 10 includes a clamping body 18, a keeper 20, and a clamping fastener assembly 22. The clamping fastener assembly 22 is configured for clamping a cable 12 between the clamping body 18 and the keeper 20 as shown in FIG. 2.

Figure 3:
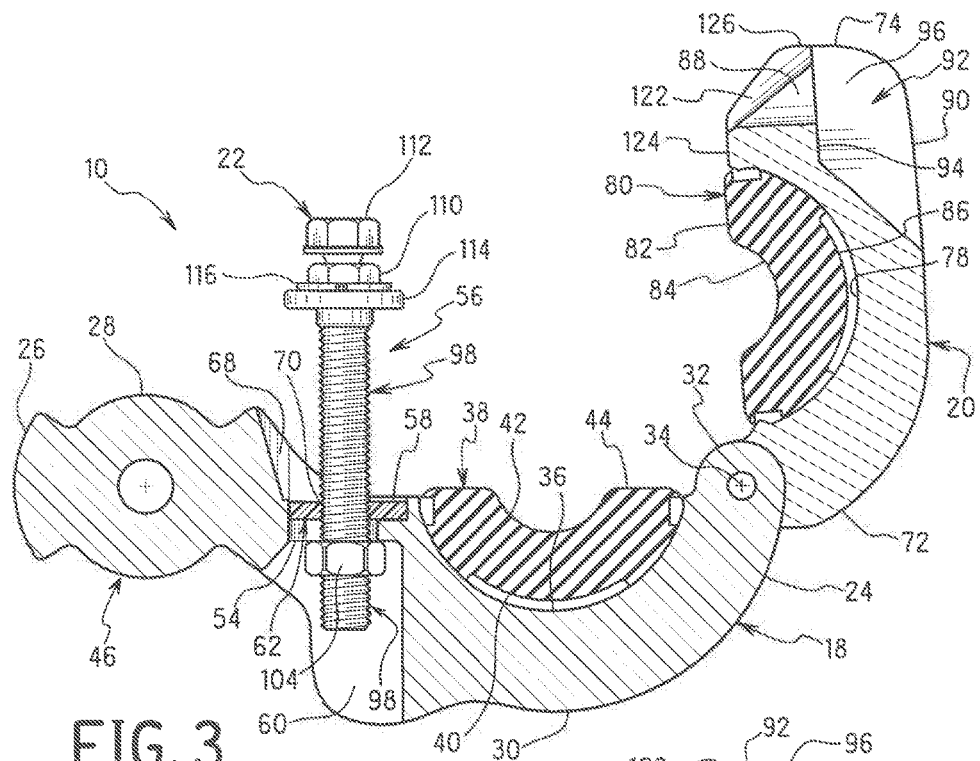
FIG. 3 is a side view in cross section showing the keeper in the open position and the clamping fastener biased in the clamping position.
Figure 4:
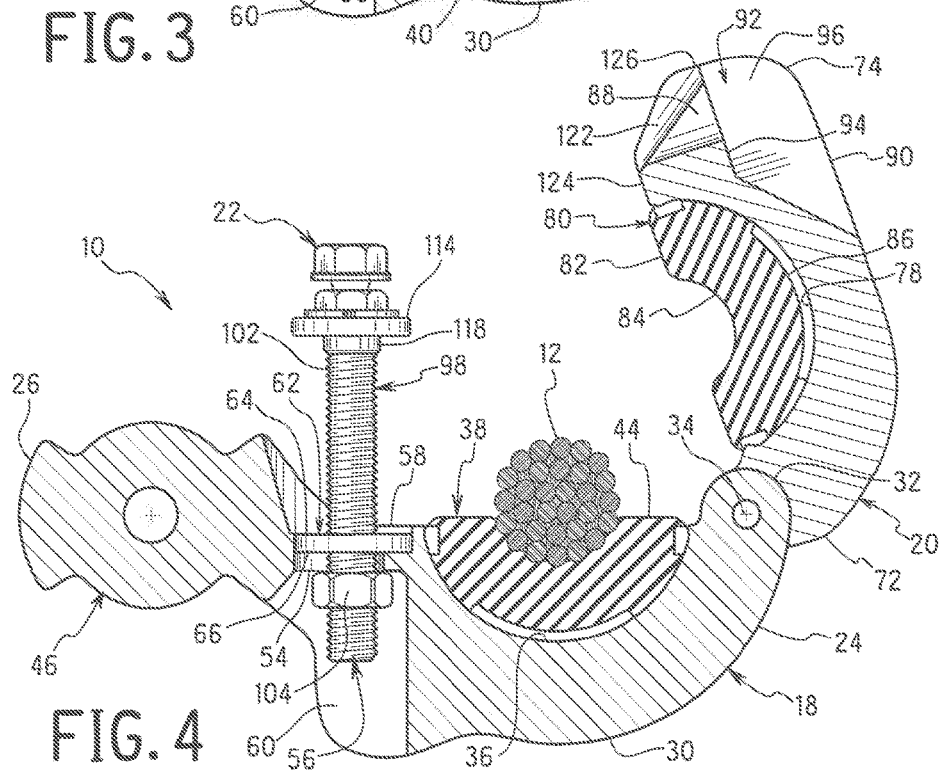
FIG. 4 is a side view in cross section showing the cable positioned between the clamping body and the keeper.

The clamping body 18 in one embodiment of the invention shown in FIG. 2 is constructed for clamping a single cable 12 to resist movement of the cable 12 relative to an adjacent cable supported by the frame. Referring to FIG. 3, the clamping body 18 has first longitudinal end 24, a second longitudinal end 26, a top face 28 and a bottom face 30. The first end 24 has a hinge member 32 with a hole 33 for receiving a hinge pin 34 and defining a pivot axis of the keeper 20 relative to the clamping body 18. As shown in FIGS. 3-8, the pivot axis defined by the hole 33 and the hinge pin 34 is substantially perpendicular to the longitudinal dimension of the clamping body 18 and substantially parallel to the longitudinal axis of the cable 12 when clamped in the assembly 10.

A cable recess 36 is provided in the top face of the clamping body 18 between the first end 24 and the second end 26. The cable recess 36 has a substantially semi-circular configuration with a concave shape that is open to the top face 28. The cable recess 36 has a dimension for receiving and clamping the cable 12. In the embodiment shown in FIGS. 3-8, an electrically insulating grommet 38 is received in the recess 36 for supporting the cable 12 within the recess 36. The grommet 38 is made of an electrically insulating material to prevent electrical connections between the cable 12 and the clamping assembly 10. The grommet 38 as shown has an outer convex surface 40 with a shape and dimension complementing the shape of the recess 36 and for being received in the recess 36 of the clamping body 18. The grommet 38 has a concave recess 42 on an inner face 44 for receiving and supporting the cable 12. The grommet 38 can be coupled to the clamping body 18 by friction fit, an adhesive or suitable fastener.

The second end 26 of the clamping body 18 includes an arm 46 extending outwardly for coupling to the arm 14 or other support structure. The arm 46 has opposite side faces 48 and a bolt hole extending between the side faces 48 for receiving a mounting bolt 50 to couple the clamping body 18 and the clamping assembly 10 to the arms 14 of the support structure. The side face 48 are provided with ribs 52 extending radially outward from the bolt hole for mating with a complementing surface of the arms 14 of the support to maintain the clamping assembly 10 in a desired fixed position relative to the arm of a support frame or other support structure.

Figure 11:
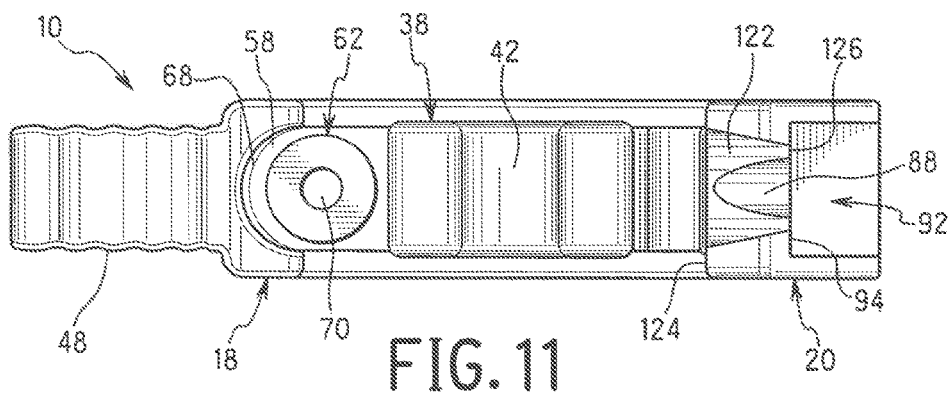
FIG. 11 is a bottom view of the clamping assembly showing the fastener in the clamping position.

The clamping body 18 has a hole 54 defining a passage extending between the top face 28 and the bottom face 30 for receiving the clamping fastener assembly 22 as shown in FIG. 3 and FIG. 11. In the embodiment shown, the clamping fastener assembly 22 includes a clamping bolt 56. As shown in FIG. 11, the hole 54 defines a bolt hole for the clamping bolt 56 so that the clamping bolt 56 extends through the clamping body 18 and extends upwardly and outwardly from the top face 28 of the clamping body 18 toward the keeper 20 in the clamping position.

In the embodiment shown in FIGS. 3-10, the bolt hole 54 is positioned between the first end 24 and the second end 26 and next to or adjacent the recess 36. The bolt hole 54 is oriented in the clamping body 18 on the side of the recess 36 opposite from the hinge member 32 and between the recess 36 and second end 26 of the clamping body 18.

The clamping body 18 has a concave recess 58 in the top face 28 surrounding the bolt hole 54. In the embodiment shown, the recess 58 has a substantially circular shape. A concave recess 60 is formed in the bottom face 30 of the clamping body 18 with a dimension for receiving the fastener assembly 22. The recess 60 has an elongated shape with a longitudinal dimension extending in the longitudinal dimension of the clamping body 18. As shown in FIG. 11, the passage forming the bolt hole 54 extends between the recess 58 in the top face 28 and the recess 60 in the bottom face 30. The bolt hole 54 has an elongated shape with a width to receive the clamping bolt 56 and a longitudinal length to allow limited sliding and/or pivoting movement of the clamping bolt 56 in the longitudinal direction of the clamping body 18.

Figure 13:
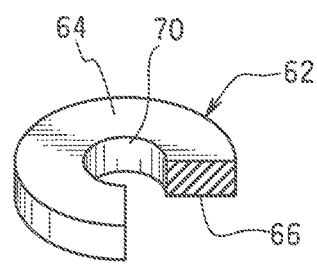
FIG. 13 is a perspective view of the resilient biasing member.

A bolt retaining member is provided for retaining the clamping bolt 56 in a first clamping position relative to the keeper 20 as shown in FIG. 3. In one embodiment of the invention, the retaining member is a resilient member 62 in the form of a grommet or washer-like member configured for supporting the clamping bolt 56. In the embodiment shown in FIG. 13, the retaining member has an annular shape to receive the clamping bolt 56. The resilient retaining member 62 has an outer dimension complementing the inner dimension of the recess 58 so that the resilient member 62 is received and secured in the recess 58 by a friction fit. In one embodiment, the resilient member 62 has an outer diameter greater than the inner diameter of the recess 58 so that the resilient member is coupled to the clamping body 18 within the recess 58 by a friction fit. As shown, the resilient member 62 has a height corresponding to the depth of the recess 58 and a substantially flat top face 64. In one embodiment, the top face 64 projects a slight distance above the open top edge of the top face 28 of the clamping body 18 and is positioned with the top face 58 of the clamping body 18. The resilient member 62 has a bottom face 66 opposite the top face 64 with a shape and dimension for mating with the bottom face of the recess 58.

Figure 12:
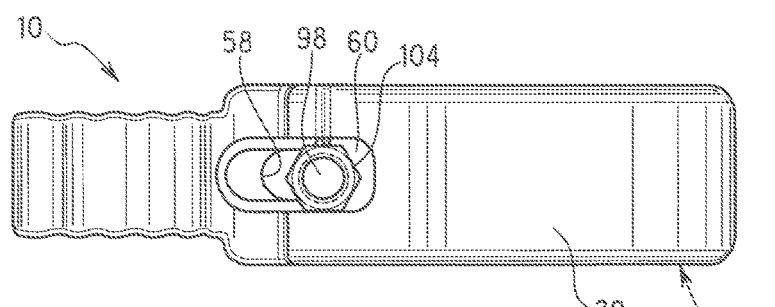
FIG. 12 is a top view of the clamping assembly showing the keeper in the open position.

In the embodiment shown in FIGS. 2 and 3, the top face 58 of the clamping body 18 around the top edge of the recess 58 defines a concave recess 68. The concave recess 68 extends at an inclined angle with respect to the longitudinal dimension of the clamping body 18 to allow the clamping bolt 56 to tilt outwardly with respect to the center axis of the bolt hole 54. As shown in FIG. 12, the concave recess 68 extends away from the bolt hole 54 toward the second end 26.

The resilient member 62 has an aperture 70 defining a bolt hole extending between the top face 64 and the bottom face 66 with a dimension for receiving the clamping bolt 56. The aperture 70 has an inner dimension less than the outer dimension of the clamping bolt 56. The resilient member 62 can be formed from a suitable material that is able to receive the clamping bolt 56 and hold the clamping bolt 56 in a selected upright position relative to the clamping body 18 and the keeper 20.

In one embodiment of the invention, the resilient member 62 is made of a flexible and resilient polymeric material or rubber-like material. The aperture 70 has an inner dimension less than an outer dimension of the clamping bolt 56 to grip the clamping bolt 56 and retain the clamping bolt 56 in a selected position. The aperture 70 in the resilient member 62 provides a friction fit for the clamping bolt 56 to prevent the clamping bolt 56 from sliding or moving in an axial direction relative to the center axis of the clamping bolt 56 and the axial dimension of the bolt hole 54. In this manner, the aperture 70 grips the outer surface of the clamping bolt 56 to prevent the clamping bolt from sliding in an axial direction of the fastener through the bolt hole 54 and retains the clamping bolt 56 in an extended clamping position shown in FIGS. 3-10.

As shown, the bolt hole 54 in the clamping body 18 has a slightly elongated configuration extending in the longitudinal dimension of the clamping body 18. The elongation of the bolt hole 54 enables the clamping bolt 56 to move and pivot or tilt in the longitudinal direction of the clamping body 18 as shown in the sequence of FIGS. 5-10. The top face 28 of the clamping body 18 includes a the concave recess 66 extending next to the bolt hole 54 to form a relief for the shaft of the clamping bolt 56 when the clamping bolt 56 is moved from the clamping position.

Figure 10:
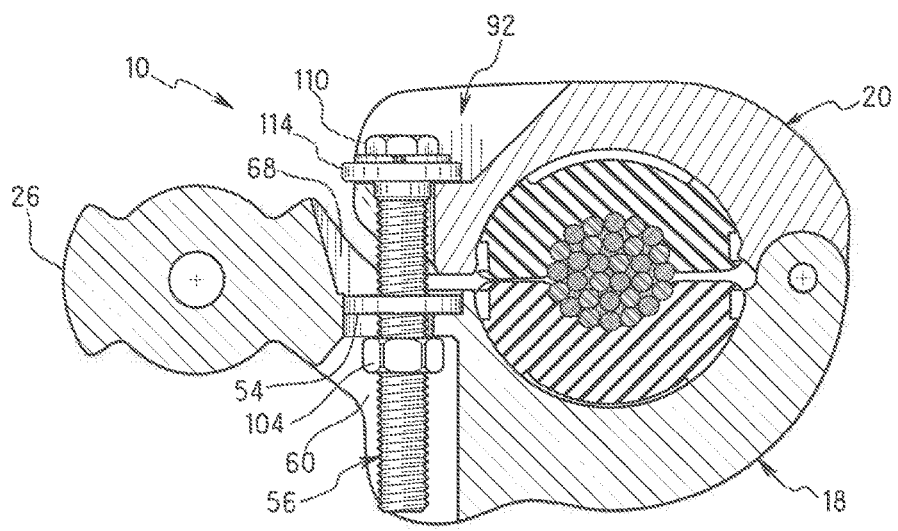
FIG. 10 is a side view in cross section showing the fastener in the clamping position.

The keeper 20, in one embodiment of the invention, has a shape and dimension complementing the shape and dimension of the clamping body 18. The keeper 20 has a first end 72 coupled to the clamping body 18 and a second free end 74. In one embodiment of the invention the first end 72 has a hinge hole aligned for receiving the hinge pin 34 and coupling the keeper 20 to the clamping body 18 and allowing the keeper 20 to pivot between an open position shown in FIG. 3 for receiving a cable and a closed clamping position for clamping the cable as shown in FIG. 10. A concave recess 78 is provided for aligning with the recess 36 of the clamping body 18 for receiving the cable. An insulating grommet 80 is received in the recess 78 for contacting and gripping the cable. The insulating grommet 80 has an inner face 82 with a concave recess 84 with a dimension for gripping the cable. An outer convex face 86 of the insulating grommet 80 has a shape and dimension complementing the recess 78 and is received in the recess 78 for clamping the cable.

The second end 74 of the keeper 20 has a slot 88 with an open end 90 extending from the second end 74 toward the first end 72 in a longitudinal direction with respect to the longitudinal axis of the keeper 20. The slot 88 has a dimension to receive the clamping bolt 56 and is aligned with the clamping bolt 56 and the hole 54 when the keeper 20 is in the closed clamping position. The slot 88 has a width to enable the clamping bolt 56 to slide into the slot 88 to a clamping position. As shown, the keeper 20 has a top face 90 with a recess 92 having a bottom surface 94 and a side surface 96 to receive the fastener 56. The slot 88 is formed in the recess 92 and spaced from the side surfaces 96 a distance for receiving the head of the clamping bolt 56.

The second end 74 of the keeper 20 includes an inclined contact surface 122 on a bottom face 124 of the keeper 20 as shown in FIGS. 3-10 and FIG. 12. The contact surface 122 is formed at an incline extending from the bottom face 124 to the open end 126 of the slot 88 formed in the keeper 20. The contact surface 122 defines a guide surface for guiding the end of the clamping bolt 56 over the second end of the keeper 20 into the slot 88 during the closing of the keeper 20 to the clamping position. In the embodiment show in FIG. 3, the contact surface 122 is a concave recess forming a substantially semi-circular or frustoconical surface with a longitudinal dimension extending at an incline to the second end of the keeper 20 as shown in FIG. 12.

In the embodiment shown, the clamping bolt 56 is provided for clamping the keeper 20 and the clamping body 18 in a clamping position and for clamping the cable in the respective recesses. The clamping bolt 56 has a shaft 98 extending in the longitudinal direction of the bolt with a first end having external threads 102 receiving a threaded nut 104. A pin 106 extends through a hole in the clamping body 18 into the cavity to retain the nut 104 on the threaded end of the shaft 98. In one embodiment, the pin 106 can be a split roll pin or a spring pin. A second end of the shaft 98 includes a head 110 for contacting the top face of the keeper in the clamping position. A breakaway drive head 112 is spaced from the head 110 by a frangible section between the drive head 112 and the head 110. The breakaway drive head 112 breaks from the shaft when sufficient torque is applied.

In one embodiment of the invention, the clamping bolt 56 of the fastener assembly 22 includes a washer 114 and a locking washer 116 having a dimension for being received in and contacting the recess in the keeper 20. A retainer 118 is positioned on the shaft 98 between the washer 114 and the head 110 of the clamping bolt 56 to retain the washer 114 and the locking washer 116 next to or adjacent the head 110. The retainer 118 is made from a resilient material and has a central aperture with an inner diameter less than the outer diameter of the shaft 98 so that the retainer grips the outer surface of the shaft 98 by a friction fit to retain the washers 114 and 116 at the second end of the shaft 98 next to the head 110. In one embodiment, the retainer 118 has inwardly extending fingers for engaging the outer surface of the shaft 98. In other embodiments, the retainer can have a circular aperture with a dimension for contacting the shaft 98 with a friction fit. In the embodiment shown, the retainer 118 is made of spring steel although the retainer can be made from other materials.

Figure 5:
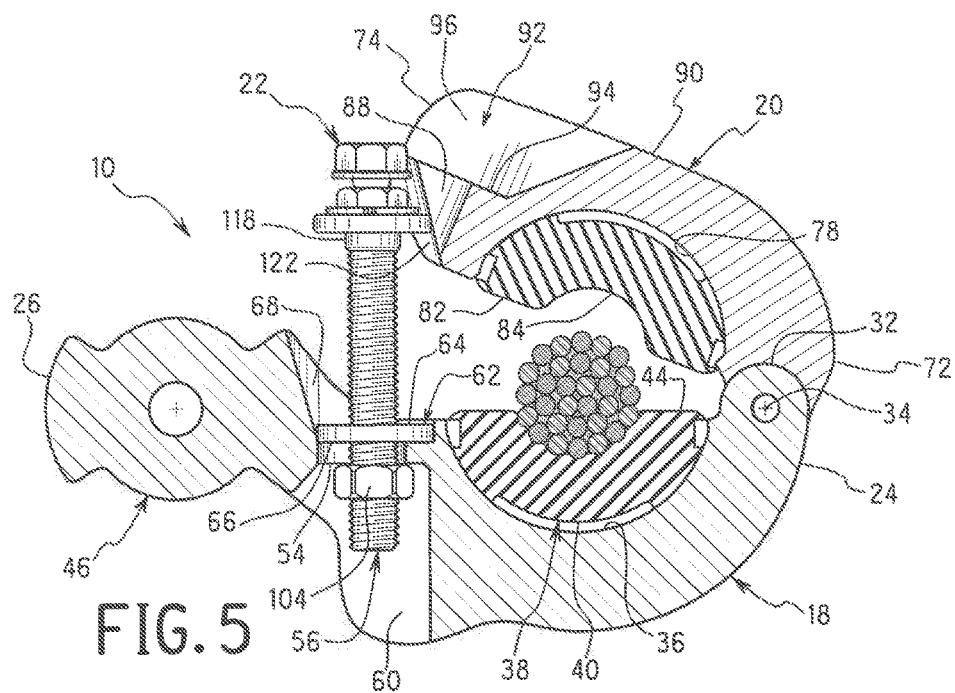
FIG. 5 is a side view in cross section showing the end of the keeper contacting the fastener during closing of the keeper.

In use, the second end of the cable body 18 of the cable clamp assembly 10 is coupled to the arms of the support frame for supporting a plurality of cables as shown in FIG. 1. A cable 12 is positioned in the recess of the grommet in the cable clamp body 18. The keeper 20 is pivoted from the open position shown in FIGS. 3 and 4 to the closed position shown in FIGS. 9 and 10 to capture the cable 12 in the recess of the grommet of the keeper 20 and between the keeper 20 and the clamping body 18. As shown in FIGS. 2 and 3, the resilient member 62 holds the bolt clamping 56 in the upright clamping position. The keeper 20 is closed so that the inclined concave surface 122 of the keeper 20 contacts the edge of the washer as shown in FIG. 5. As shown in FIG. 5, the resilient member 62 retains and biases the clamping bolt 56 in an upright position extending outwardly from the clamping body 18 and defining a clamping position. The resilient member 62 retains the clamping bolt 56 in the extended position as shown and prevents the clamping bolt 56 from sliding through the hole in the clamping body 18 to enable pivoting in the longitudinal direction of the bolt hole 54.

Figure 6:
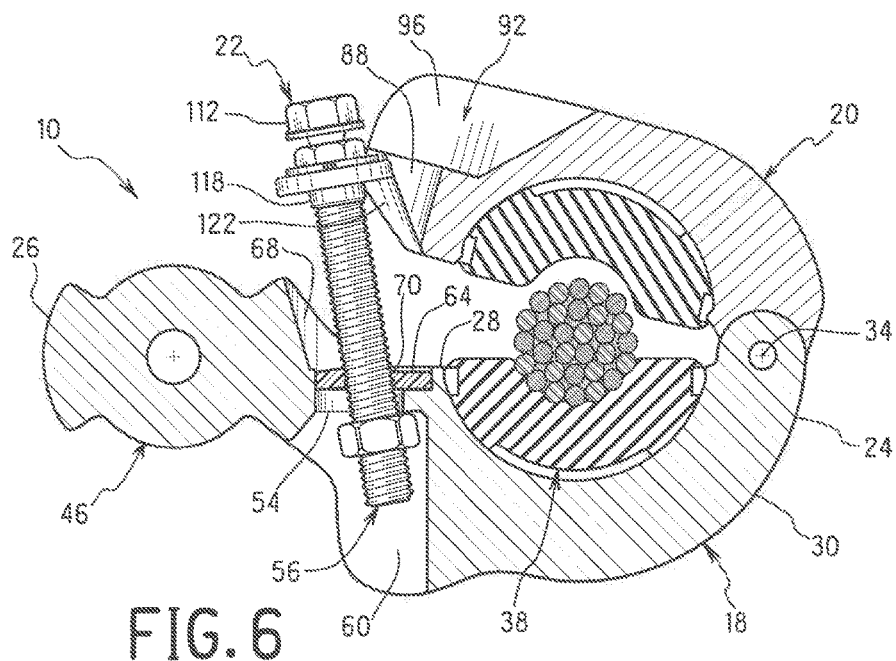
FIG. 6 is a side view in cross section showing the keeper contacting the fastener and the bolt sliding on the edge of the keeper while closing the keeper.
Figure 7:
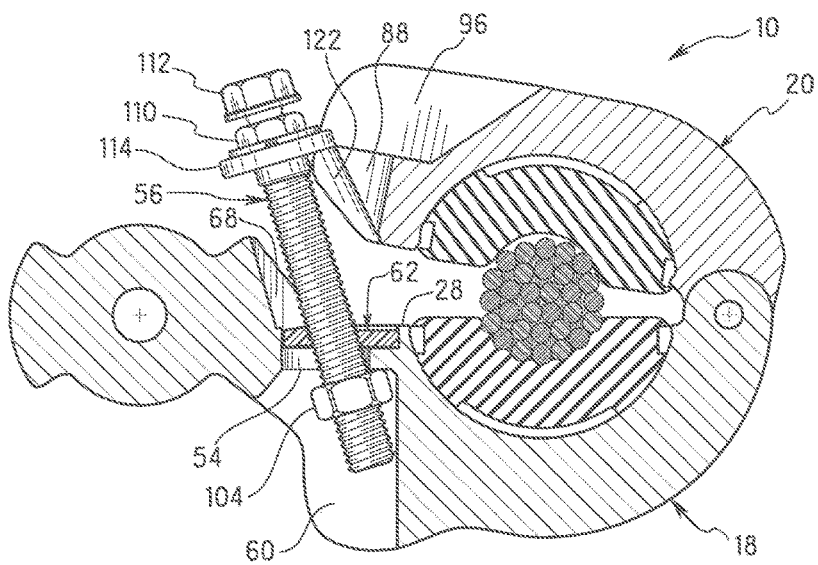
FIG. 7 is a side view in cross section showing the fastener sliding on the keeper to the open end of the slot in the keeper.
Figure 8:
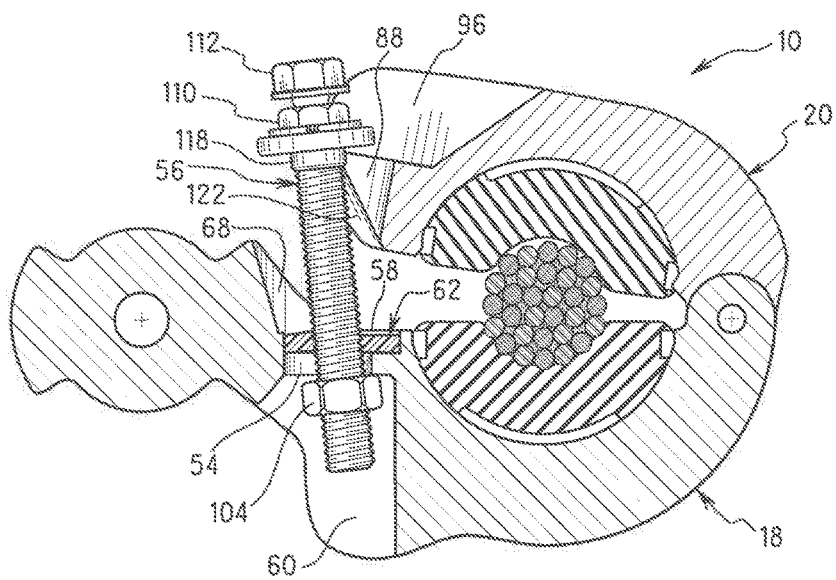
FIG. 8 is a side view in cross section showing the fastener biased into the open slot in the keeper.

As the keeper 20 is pivoted to the closed position, the inclined concave contact surface 122 of the keeper 20 contacts the head 110 and washer 114 to move and tilt the axis of the shaft 98 of the clamping bolt 56 away from the clamping position against the biasing force of the resilient retainer member 62 as shown in FIG. 6. The second end of the bolt 56 swings or tilts away from the keeper 20 by the head 110 of the clamping bolt 56 contacting and sliding along the inclined contact surface 122 of the keeper 20 as shown in FIGS. 6 and 7. The clamping bolt 56 pivots with respect to the resilient member 62 within the aperture 70 of the resilient member 62 so that the second end of the clamping bolt 56 pivots and slides toward the second end of the keeper 20 against the biasing force of the resilient retainer member 64. As the keeper 20 continues to move toward the closed position, the washers and the head of the shaft 98 slide over the second end of the keeper 20 until the shaft is aligned with the slot and the shaft is able to slide into the slot by the biasing force of the resilient member 62 into a clamping position for clamping the cable as shown in FIGS. 7 and 8. Once the head and washer slide over the second end of the keeper, the resilient member 62 biases the shaft of the bolt to the original clamping position shown in FIG. 7 where the bolt is aligned with the slot and the head and washer are able to engage the bottom surface 94 of the recess 92 in the top face 90 of the keeper 20.

Figure 9:
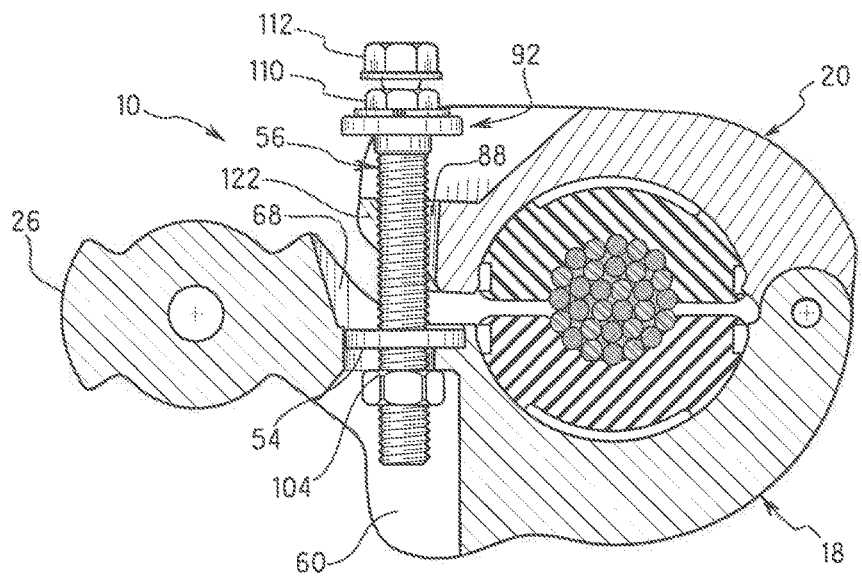
FIG. 9 is a side view in cross section showing the fastener biased in the clamping position.

After the clamping bolt 56 is positioned in the slot 88 as shown in FIG. 9, the clamping bolt 56 is tightened relative to the nut 104. A suitable tool, such as a wrench, is connected to the hex shaped breakaway head 112. The nut 104 is captured between the side walls of the recess 60 to prevent rotation of the nut 104 relative to the clamping bolt 56. The clamping bolt 56 is tightened until the breakaway head 112 separates from the clamping bolt 56 as shown in FIG. 10.

The resilient member 62 is provided to bias the bolt to the clamping position so that closing the keeper 20 with respect to the clamping body 18 enables the bolt to pivot back to the clamping position without the operator manually holding, moving and positioning the bolt relative to the keeper 20 and the clamping body 18. The user is able to close the keeper 20 around the cable 12 into contact with the head and washer of the bolt to push the second end of the clamping bolt 56 against the biasing force of the resilient member until the head and washer slide over the end of the keeper 20 and the shaft of the clamping bolt 56 snaps back into the slot 88 by the biasing force of the resilient member 62. In this manner, it is not necessary for the operator to manually move the clamping bolt away from the keeper during the closing operation or manually move the clamping bolt into the slot to the clamping position.

The foregoing embodiment and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. A clamp assembly comprising:
   a clamping body having a first recess configured for receiving a cable and having a passage extending through said clamping body;

a clamping bolt having a first end received in said passage of said clamping body and a second end; and a keeper with a first end coupled to a said clamping body, said keeper having a second end with a slot having an open end and configured for receiving said clamping bolt, said second end of said keeper having a guide surface configured for contacting said clamping bolt when closing said keeper with respect to said clamping body and guiding said clamping bolt to said open end of slot and into said slot for clamping the cable between said clamping body and said keeper, said guide surface having an inclined concave recess having a shape complementing an outer dimension of said clamping bolt.

2. The clamp assembly of claim 1, further comprising a biasing member to bias said clamping bolt with respect to said clamping body to a clamping position in said keeper.

3. The clamp assembly of claim 2, wherein said biasing member is a resilient member having a bolt hole aligned with said passage for receiving said clamping bolt and biasing said clamping bolt in a clamping position; and said resilient member enables said clamping bolt to deflect from said clamping position to an open position when said bolt contacts and slides along said guide surface of said keeper, and return said clamping bolt to said clamping position when said clamping bolt is received in said slot.

4. The clamp assembly of claim 3, wherein said clamping body has a second recess around said passage on the top face of the clamping body, and where said resilient member is a resilient grommet received in said second recess.

5. The clamp assembly of claim 3, wherein said bolt hole in said resilient member has a dimension to receive said clamping bolt and to retain said clamping bolt in an axial position with respect to said passage of said clamping body.

6. The clamp assembly of claim 1, wherein said guide surface of said keeper is an inclined surface extending between an inner face of said keeper and said open end of said slot for guiding said clamping bolt to said open end of said slot during closing of the keeper with respect to said clamping body.

7. A spacer assembly comprising;

a clamping body having a first end, a second end having a mounting member for mounting said spacer assembly to a support, a first recess between said first end and second end configured for receiving a cable, and a hole forming a passage extending through said clamping body;

a fastener having a first end received in said passage and a second end spaced from said clamping body, said fastener being biased to a clamping position for clamping alignment; and a keeper having a first end coupled to said first end of said clamping body and having a second recess configured for receiving the cable and for cooperating with said first recess, a slot formed in a second end of said keeper and having an open end, said slot configured for receiving said fastener in the clamping position, said keeper having an inclined surface on a bottom face and extending to said open end of said slot, said inclined surface having a concave recess with a shape complementing a shape of said fastener for contacting said second end of said fastener when closing said keeper with respect to said clamping body and guiding said second end of said fastener to said open end of said slot and into said slot into a clamping position for clamping the cable between said clamping body and said keeper.

8. The clamp assembly of claim 7, wherein said fastener is a bolt having a bolt head at a second end, and said hole formed in said clamping body is a bolt hole receiving said first end of said clamping bolt.

9. The clamp assembly of claim 8, wherein said clamping bolt includes a washer at said second end next to said bolt head, and a retainer for retaining said washer at said second end of said clamping bolt.

10. The clamp assembly of claim 8, further comprising a resilient member coupled to said clamping body, said resilient member having a bolt hole receiving said clamping bolt and biasing said clamping bolt to said clamping position and enabling said bolt to deflect to a second position when contacting and sliding on said inclined surface of said keeper.

11. The clamp assembly of claim 10, wherein said clamping body has a second recess formed in a top surface and surrounding said hole in said clamping body, and said resilient member is received in said second recess.

12. The clamp assembly of claim 11, wherein said clamping bolt has a threaded nut at said first end for engaging a bottom face of said clamping body, and a head at said second end for rotating said bolt relative to said nut for clamping the cable between said clamping body and said keeper.

13. The clamp assembly of claim 7, wherein said concave surface on said inclined surface of said keeper has a semi-circular shape with a dimension complementing an outer dimension of said clamping bolt.

14. The clamp assembly of claim 10, wherein said keeper has a recess in said top face for receiving said bolt head, and where said slot is formed in said recess, and said inclined surface is formed on the bottom face of said keeper opposite said recess, said inclined surface configured to contact said second end of said bolt to pivot said clamping bolt with respect to said resilient member.

15. A clamp assembly comprising:

a clamping body having a first end, a second end and a first recess between said first end and second end and configured for receiving a cable, said clamping body having a bolt hole defining a passage extending between a top face and a bottom face;

a resilient member on said clamping body, said resilient member having a bolt hole aligned with said bolt hole of said clamping member;

a clamping bolt received in and captured by said bolt hole of said resilient member and said bolt hole of said clamping body, said bolt being resiliently biased in said bolt hole of said resilient member to a clamping position; and a keeper having a first end coupled to said first end of said clamping body, said keeper having a second end with an open slot configured for mating with said clamping bolt in said clamping position, said keeper having a contact surface oriented to contact said clamping bolt during closing of said keeper with respect to said clamping body and guiding said bolt along said contact surface into said slot, said guide surface having an inclined concave recess having a shape complimenting an outer dimension of said clamping bolt, said resilient member enabling said clamping bolt to move from the clamping position to a second position received in said inclined concave recess when contacting said contact surface and into said slot to said clamping position for clamping the cable between said keeper and said clamping body.

16. The clamp assembly of claim 15, wherein said top surface of said clamping body has a second recess around said bolt hole, and where said resilient member is received in said second recess.

17. The clamp assembly of claim 16, wherein said bolt hole of said resilient member has a dimension to receive said clamping bolt and retain said clamping bolt in a clamping position relative to said clamping body.

18. The clamp assembly of claim 15, wherein said inclined concave recess is inclined relative to an axis of said bolt in the clamping position.

19. The spacer assembly of claim 18, wherein said inclined concave recess is inclined at an angle extending from said bottom face of said keeper to said open end of said slot to guide said bolt to said clamping position in said slot of said keeper, said inclined concave recess having a shape complementing an outer dimension of said clamping bolt.

* * * * *